US010150338B2

(12) United States Patent
Sato et al.

(10) Patent No.: US 10,150,338 B2
(45) Date of Patent: Dec. 11, 2018

(54) HEAVY DUTY PNEUMATIC TIRE (71) Applicant: The Yokohama Rubber Co., LTD., Minato-ku, Tokyo (JP)

(72) Inventors: Toshiyuki Sato, Hiratsuka (JP); Shoei Kakuta, Hiratsuka (JP); Hideki Hamanaka, Hiratsuka (JP); Yukihito Yamaguchi, Hiratsuka (JP); Risa Tauchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/328,464

(22) PCT Filed: Jul. 23, 2015

(86) PCT No.: PCT/JP2015/070934
§ 371 (c)(1),
(2) Date: Jan. 23, 2017

(87) PCT Pub. No.: WO2016/013604
PCT Pub. Date: Jan. 28, 2016

(65) Prior Publication Data
US 2017/0210180 A1    Jul. 27, 2017

(30) Foreign Application Priority Data

Jul. 23, 2014 (JP) .................................. 2014-149830
May 13, 2015 (WO) .................. PCT/JP2015/063719

(51) Int. Cl.
*B60C 11/11* (2006.01)
*B60C 11/13* (2006.01)
*B60C 11/03* (2006.01)

(52) U.S. Cl.
CPC .............. *B60C 11/13* (2013.01); *B60C 11/03* (2013.01); *B60C 11/11* (2013.01);
(Continued)

(58) Field of Classification Search
CPC .......................... B60C 11/11; B60C 2200/065
See application file for complete search history.

(56) References Cited

U.S. PATENT DOCUMENTS

D457,128 S  *  5/2002  Robert .......................... D12/579
2004/0211502 A1 * 10/2004  Ono ........................ B60C 11/00
152/209.19
(Continued)

FOREIGN PATENT DOCUMENTS

JP          08-276708      * 10/1996
JP          H09-136514       5/1997
(Continued)

OTHER PUBLICATIONS

English machine translation of JP08-276708, no date.*
(Continued)

*Primary Examiner* — Robert C Dye
(74) *Attorney, Agent, or Firm* — Thorpe North & Western (57) ABSTRACT Provided is a heavy duty pneumatic tire that includes a tread portion including, in a tread pattern: shoulder lug grooves extending outward in the tire width direction and opening at ground contact edges; a pair of circumferential primary grooves; center lug grooves; center blocks defined by the center lug grooves and the pair of circumferential primary grooves and aligned in the tire circumferential direction; and circumferential secondary grooves extending in the tire circumferential direction in the center block regions and opening to the center lug grooves adjoining the center blocks. The circumferential secondary grooves extend in the tire circumferential direction while changing positions in the tire width direction and each include third groove turning portions formed into a bent shape or a curved shape. The (Continued)

ratio P4/P1 of the width P4 of the circumferential secondary grooves to the width P1 of the circumferential primary grooves is from 0.70 to 1.10.

20 Claims, 6 Drawing Sheets (52) U.S. Cl.
CPC . *B60C 2011/036* (2013.01); *B60C 2011/0346* (2013.01); *B60C 2011/0348* (2013.01); *B60C 2011/0353* (2013.01); *B60C 2011/0355* (2013.01); *B60C 2011/0365* (2013.01); *B60C 2011/1361* (2013.01); *B60C 2200/065* (2013.01)

(56) References Cited

U.S. PATENT DOCUMENTS

| | | |
|---|---|---|
| 2007/0199633 A1 | 8/2007 | Hayashi |
| 2008/0078488 A1 | 4/2008 | Yoda |
| 2009/0032157 A1* | 2/2009 | Inoue .................. B60C 11/0311 152/209.8 |

FOREIGN PATENT DOCUMENTS

| | | | |
|---|---|---|---|
| JP | 2004-098914 | * | 4/2004 |
| JP | 2004-224131 | | 8/2004 |
| JP | 2006-151083 | | 6/2006 |
| JP | 2008-279976 | | 5/2007 |
| JP | 2007-191093 | | 8/2007 |
| JP | 2010-125999 | | 6/2010 |
| WO | WO 2006/001202 | | 1/2006 |
| WO | WO 2006/057169 | | 6/2006 |

OTHER PUBLICATIONS

English machine translation of JP2008-279976, no date.*
English machine translation of JP2004-098914 (Year: 2004).*
International Search Report for International Application No. PCT/JP2015/070934 dated Aug. 25, 2015, 4 pages, Japan.

* cited by examiner

HEAVY DUTY PNEUMATIC TIRE

TECHNICAL FIELD

The present technology relates to a heavy duty pneumatic tire having a tread pattern.

BACKGROUND ART

A heavy duty tire fitted to a large vehicle, such as a dump truck, is provided with a plurality of center blocks disposed in a central region of the tread surface in the tire width direction. Such a heavy duty tire can effectively improve in wear resistance and cut resistance in the central region by increasing a contact area of the center blocks. However, an increased contact area of the center blocks increases the block volume and thus lessens heat resistance, causing tire durability to be lessened in some cases.

Conventional heavy duty tires provided with a plurality of center blocks formed on tread surfaces include, for example, a tire according to Japanese Unexamined Patent Application Publication No. H09-136514A. The heavy duty tire according to Japanese Unexamined Patent Application Publication No. H09-136514A includes, in a tread, at least one circumferential groove extending in the circumferential direction and a large number of lateral grooves connecting with the circumferential groove and disposed on both sides of the circumferential groove while being separated from each other in the circumferential direction. In the pneumatic tire:

(1) the circumferential groove extends in the circumferential direction in a tread central region that corresponds to 50% of the tread width;

(2) the depth of the circumferential groove is 5% of the tread width or greater; and (3) the depth of at least lateral grooves disposed in both side sections of the tread among the lateral grooves is 109% of the depth of the circumferential groove or greater.

According to Japanese Unexamined Patent Application Publication No. H09-136514A, this heavy duty tire achieves good traction performance in traveling on a bad road and wet performance in traveling at high speed in a compatible manner.

Unfortunately, the tire according to Japanese Unexamined Patent Application Publication No. H09-136514A has insufficient heat resistance.

If, for example, a groove extending in the tire circumferential direction is provided in center block regions to enhance heat resistance, it is expected that heat buildup in the center blocks is prevented and that heat resistance is enhanced. However, stones are readily lodged in the groove especially in traveling off-road.

SUMMARY

The present technology provides a heavy duty pneumatic tire that achieves good resistance to stone lodging and heat resistance in a compatible manner.

According to an embodiment of the present technology, a heavy duty pneumatic tire having a tread pattern, includes a tread portion. The tread portion includes, in the tread pattern: a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends; a plurality of shoulder lug grooves being disposed in each of the half-tread regions and separated from each other in the tire circumferential direction, the shoulder lug grooves extending outward in the tire width direction, the shoulder lug grooves including ends on an outside in the tire width direction opening at ground contact edges positioned on both sides in the tire width direction, the shoulder lug grooves including ends on an inside in the tire width direction positioned outward in the tire width direction with respect to ends of the center lug grooves, and the shoulder lug grooves each being disposed, in the tire circumferential direction, between adjacent center lug grooves in the tire circumferential direction among the center lug grooves; a pair of circumferential primary grooves being disposed in the respective half-tread regions, the circumferential primary grooves each being provided with first groove turning portions being curved or bent outward in the tire width direction and second groove turning portions being curved or bent inward in the tire width direction, the first groove turning portions and the second groove turning portions being arranged such that each of the pair of circumferential primary grooves alternately connects one of the ends of the center lug grooves and one of the ends of the shoulder lug grooves on the inside in the tire width direction, the circumferential primary grooves extending in the tire circumferential direction and being formed in wave-like shapes and having a narrower width than a width of the shoulder lug grooves; a plurality of center blocks being defined by the center lug grooves and the pair of circumferential primary grooves and being aligned in the tire circumferential direction; and circumferential secondary grooves extending in the tire circumferential direction in respective regions of the center blocks and opening to the center lug grooves adjoining the center blocks. The circumferential secondary grooves extend in the tire circumferential direction while changing positions thereof in the tire width direction, the circumferential secondary grooves including third groove turning portions being formed into a bent shape or a curved shape, the circumferential secondary grooves changing extending directions thereof in the tire width direction at the third groove turning portions. A ratio $P_4/P_1$ of a groove width $P_4$ of the circumferential secondary grooves to a groove width $P_1$ of the circumferential primary grooves is from 0.70 to 1.10.

Preferably, the center lug grooves each include a fourth groove turning portion being bent or curved so as to protrude toward a third side in the tire circumferential direction on the first side and a fifth groove turning portion being bent or curved so as to protrude toward a fourth side opposite to the third side in the tire circumferential direction on the second side. The center lug grooves connect with the circumferential primary grooves at first connection ends thereof on the first side and at second connection ends thereof on the second side, the first connection ends and the second connection ends connecting with tips of the second groove turning portions on the inside in the tire width direction, the second connection ends of the center lug grooves being positioned on the third side in the tire circumferential direction with respect to the first connection ends. Concerning a central position of each of the center lug grooves in a groove width direction, an inclination angle with respect to the tire width direction of a first straight line that connects the first connection end with a protruding end protruding toward the third side in the tire circumferential direction, of the fourth groove turning portion and an inclination angle with respect to the tire width direction of a second straight line that connects the second connection end with a protruding end protruding toward the third side in the tire circumferential direction, of the fifth groove turning portion are greater than an inclination angle with respect to the tire width direction of a third straight line that connects the first connection end with the second connection end of each of the center lug grooves.

Preferably, concerning the central position of each of the center lug grooves in the groove width direction, a section of the center lug groove between the protruding end protruding toward the third side in the tire circumferential direction, of the fourth groove turning portion and the first connection end is on the first straight line or on the third side with respect to the first straight line, and a section of the center lug groove between the protruding end protruding toward the fourth side in the tire circumferential direction, of the fifth groove turning portion and the second connection end is on the second straight line or on the fourth side with respect to the second straight line.

Preferably, the circumferential primary grooves each include a raised bottom portion formed by partially making a groove depth shallow.

Preferably, a ratio $D_2/T$ of a shallowest depth $D_2$ of the raised bottom portion to a tread width T of the tread portion in the tire width direction is less than 0.05.

Preferably, a ratio $D_4/D_3$ of a deepest depth $D_4$ of the circumferential secondary grooves to a deepest depth $D_3$ of the center lug grooves is from 0.4 to 1.0.

Preferably, a ratio $A/W_B$ of a maximum width A being a maximum displacement value of the circumferential secondary grooves in the tire width direction to a maximum width $W_B$ of the center blocks is from 0.05 to 0.35.

Preferably, the center lug grooves each include a fourth groove turning portion being formed into a bent shape or a curved shape, the center lug groove changing an extending direction thereof at the fourth groove turning portion.

Preferably, each of the center lug grooves extends while turning in a plurality of positions including the fourth groove turning portion and includes a fifth groove turning portion differing from the fourth groove turning portion, and each of the center lug grooves extends so as to connect the fourth groove turning portion with the fifth groove turning portion, the fourth groove turning portion being one of the groove turning portions in one of the two center lug grooves adjoining a center block of the center blocks, and the fifth groove turning portion being one of the groove turning portions in another center lug grove of the two center lug grooves.

Preferably, each of corner portions of the center blocks formed in correspondence with the first groove turning portions, turning so as to protrude outward in the tire width direction, of the circumferential primary groove having the wave-like shapes is an obtuse angle corner.

Preferably, groove widths of the circumferential primary grooves and the center lug grooves are 7 to 20 mm.

The above-described heavy duty pneumatic tire is suitably fitted to construction or industrial vehicles.

The tire according to the present technology achieves good resistance to stone lodging and heat resistance in a compatible manner.

DETAILED DESCRIPTION

The following is a detailed description of a heavy duty pneumatic tire according to the present technology.

Figure 1:
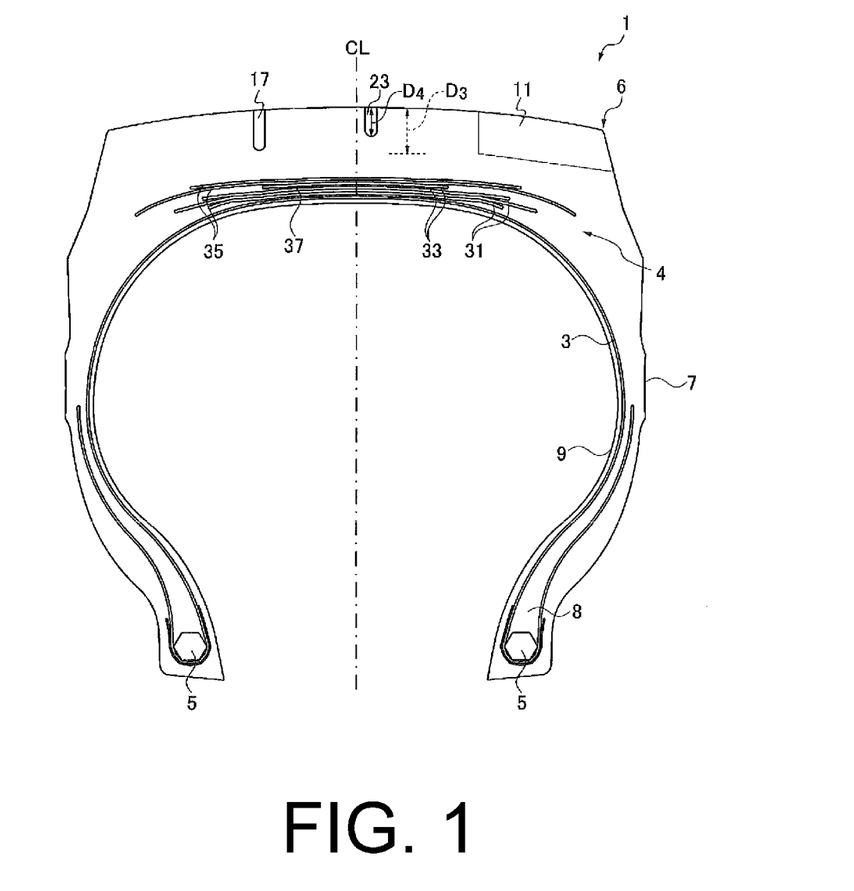
FIG. 1 is a partial cross-sectional view of a tire according to an embodiment of the present technology.

FIG. 1 illustrates a profile of a heavy duty pneumatic tire (hereinafter also referred to as a tire) 1 according to the present embodiment, including the tire rotational axis, when the tire 1 is cut in a plane cross section along the line X-X' of FIG. 2 described later.

Heavy duty pneumatic tires in this specification include tires written in Section C of JATMA YEAR BOOK 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tired rollers), and tires for mobile cranes (truck cranes, wheel cranes) written in Section D, or vehicular tires written in SECTION 4 or SECTION 6 of TRA 2013 YEAR BOOK.

The tire 1 includes, as skeletal materials, a carcass ply 3, a belt portion 4, and a pair of bead cores 5, and, around these skeletal materials, rubber layers, such as a tread portion 6, a side portion 7, a bead filler 8, and an inner liner 9.

Figure 2:
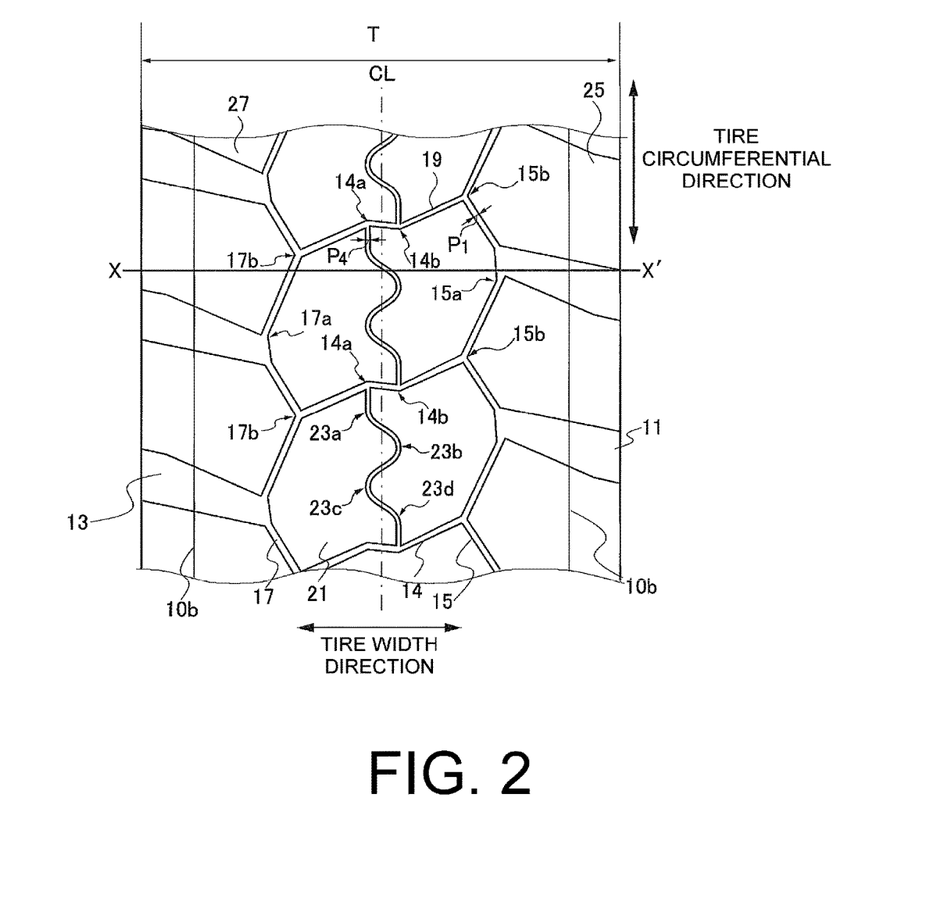
FIG. 2 is a planer development diagram of a tread pattern of the tire.

The tread portion 6 includes a tread pattern illustrated in FIG. 2. FIG. 2 is a planer development diagram of the tread pattern of the tire 1. In FIG. 2, the vertical direction is the tire circumferential direction, and the lateral direction is the tire width direction. Herein, "tire circumferential direction" refers to a direction in which a rotating surface of a tread surface rotates, the rotating surface being formed when the tire 1 rotates about the central axis of rotation of the tire. "Tire width direction" refers to a direction of the central axis of rotation of the tire 1. The orientation of the tread pattern in the tire rotating direction and the tire width direction when the tire is fitted to a vehicle is not particularly specified.

The tread pattern includes shoulder lug grooves 11, 13, a pair of circumferential primary grooves 15, 17, center lug grooves 14, and center blocks 21.

The shoulder lug grooves 11, 13 are provided in plurality in half-tread regions on both sides (a first side and a second side) of a tire equator line CL in the tire width direction while being separated from each other in the tire circumferential direction. In the half-tread regions, the shoulder lug grooves 10 extend outward in the tire width direction and each open at a closer ground contact edge between ground contact edges 10a, 10b on both sides in the tire width direction.

The ground contact edges 10a, 10b are determined as described below. The ground contact edges 10a, 10b are end portions in the tire width direction of a ground contact surface when the tire 1 is brought into contact with a horizontal surface under conditions in which the tire 1 is fitted to a standard rim and inflated to a standard inner pressure, and a load to be applied is set to 88% of a standard load. Herein, "standard rim" refers to a "measuring rim" as defined by the Japan Automobile Tyre Manufacturers Association Inc. (JATMA), a "design rim" as defined by the Tire and Rim Association, Inc. (TRA), or a "measuring rim" as defined by the European Tyre and Rim Technical Organisation (ETRTO). "Standard inner pressure" refers to "maximum air pressure" as defined by JATMA, the maximum value in "tire load limits at various cold inflation pressures"

as defined by TRA, or "inflation pressure" defined by ETRTO. "Standard load" refers to "maximum load resistance" defined by JATMA, the maximum value in "tire load limits at various cold inflation pressures" defined by TRA, or "load capacity" defined by ETRTO.

Among the shoulder lug grooves 11, 13 disposed on both sides in the tire width direction, one shoulder lug groove 11 or shoulder lug groove 13 in one of the half-tread regions is positioned, in the tire circumferential direction, between two adjacent shoulder lug grooves 13 or shoulder lug grooves 11 in the other of the half-tread regions.

The shoulder lug grooves 11, 13 have ends on the inside in the tire width direction that are positioned, in the half-tread regions, outward in the tire width direction with respect to the ends of the center lug grooves 14 described later. Each of the shoulder lug grooves 11, 13 is disposed, in the tire circumferential direction, in a shoulder region between adjacent center lug grooves in the tire circumferential direction among the center lug grooves 14. This configuration allows the circumferential primary grooves 15, 17 described later to form wavy shapes by alternately connecting the ends of the center lug grooves 14 and the ends of the shoulder lug grooves 11, 13 on the inside in the tire width direction in half-tread portions.

The shoulder lug grooves 11, 13 each have a width varying in the groove extending direction in FIG. 2 but may have a constant width.

The circumferential primary grooves 15, 17 are disposed in the half-tread regions on both sides of the tire equator line CL in the tire width direction. The circumferential primary grooves 15, 17 are provided, in the half-tread regions, with first groove turning portions 15a, 17a that are curved or bent outward in the tire width direction and second groove turning portions 15b, 17b that are curved or bent inward in the tire width direction so as to alternately connect the ends of the center lug grooves 14, described later, and the ends of the shoulder lug grooves 11, 13 on the inside in the tire width direction. This configuration allows the circumferential primary grooves 15, 17 to form wavy shapes over the entire periphery in the tire circumferential direction. The width of the circumferential primary grooves 15, 17 is narrower than the width of the shoulder lug grooves 11, 13. "Wavy shape" of a groove indicates such a shape that the groove meanders. In specific, the circumferential primary grooves 15, 17 include, on the periphery of the tire, the first groove turning portions 15a, 17a provided in plurality and bent so as to protrude outward in the tire width direction and the second groove turning portions 15b, 17b provided in plurality and bent so as to protrude inward in the tire width direction, and extend in the tire circumferential direction while meandering into wavy shapes. The wavy shapes of the circumferential primary grooves 15, 17 increase the surface area of groove walls and thus enhance heat dissipation. Accordingly, heat resistance is enhanced.

The groove turning portions may have a bent shape, a curved shape, or a combination of a bent shape and a curved shape. The curved shape includes a shape formed by rounding the peak of a bent shape, for example, with a predetermined radius of curvature. The combination of a bent shape and a curved shape indicates such a shape that one side of the peak of a groove turning portion extends straight and the other side extends from the peak while being curved. The groove turning portions included in the circumferential primary grooves 15, 17, circumferential secondary grooves 23, and the center lug grooves 14 may have the same shape or mutually different shapes among a bent shape, a curved shape, and a combination thereof.

Sections other than the groove turning portions in the circumferential primary grooves 15, 17, the circumferential secondary grooves 23, and the center lug grooves 14 may be straight or curved. If both the groove turning portions and the sections other than the groove turning portions are curved, both curved shapes may have the same radius of curvature.

The circumferential primary grooves 15, 17 connect with the shoulder lug grooves 11, 13 at the first groove turning portions 15a, 17a protruding outward in the tire width direction. The circumferential primary grooves 15, 17 connect with the center lug grooves 14 at the second groove turning portions 15b, 17b protruding inward in the tire width direction. The second groove turning portions 15b are shifted in position in the tire circumferential direction with respect to the second groove turning portions 17b in the opposite half-tread region. In FIG. 2, the circumferential primary grooves 15, 17 extend in wavy shapes having the same period and mutually shifted phases. The configuration of the circumferential primary grooves 15, 17 is not limited. For example, the circumferential primary grooves 15, 17 may extend in wavy shapes having mutually different periods or having the same phase.

The circumferential primary grooves 15, 17 are narrow grooves having a narrower width than the width of the shoulder lug grooves 11, 13. This configuration reduces ground contact pressure of the center blocks 21 in traveling and thus increases the wear life of the tire 1.

The center lug grooves 14 are provided in plurality while being separated from each other in the tire circumferential direction. The center lug grooves 14 extend in the half-tread regions on both sides of the tire equator line CL in the tire width direction so as to cross the tire equator line CL, and have both ends. The center lug grooves 14 connect the second groove turning portions 15b of the circumferential primary groove 15 with the second groove turning portions 17b of the circumferential primary groove 17, the second groove turning portions 15b, 17b being both ends of the center lug grooves 14. Since the circumferential primary grooves 15, 17 extend in wavy shapes having different phases, the center lug grooves 14 extend while being inclined with respect to the tire width direction.

The center blocks 21 are defined by the center lug grooves 14 and the circumferential primary grooves 15, 17 and are aligned in plurality in the tire circumferential direction. The tire center line CL passes through the center blocks 21.

The tread pattern further includes shoulder blocks 25, 27. The shoulder blocks 25, 27 are defined by the shoulder lug grooves 11, 13 and the circumferential primary grooves 15, 17 and are aligned in plurality in the tire circumferential direction.

The tread pattern according to the present embodiment includes the circumferential secondary grooves 23 in addition to the above-described basic configuration. As illustrated in FIG. 2, the circumferential secondary grooves 23 extend in the tire circumferential direction while changing their positions in the tire width direction, and each include third groove turning portions 23a, 23b, 23c, 23d formed into a bent shape or a curved shape. The ratio $P_4/P_1$ of the width $P_4$ of the circumferential secondary grooves 23 to the width $P_1$ of the circumferential primary grooves 15, 17 is from 0.70 to 1.10.

The circumferential secondary grooves 23 extend in the center block 21 regions and open to the center lug grooves 14 adjoining the center blocks 21. In other words, the circumferential secondary grooves 23 extend in the center block 21 regions so as to connect adjacent center lug grooves 14 in the tire circumferential direction with each other. These circumferential secondary grooves 23 formed in the center block 21 regions ensure a sufficient surface area of the grooves in the central region in the tire width direction and thus enhance heat dissipation and heat resistance. The circumferential secondary grooves 23 preferably connect with the center lug grooves 14, for example, at the tips of groove turning portions 14a, 14b, described later, of the center lug grooves 14 (in specific, in positions protruding most in the tire circumferential direction from third straight lines 14 g connecting both ends of the center lug grooves 14 (protruding ends)).

The third groove turning portions 23a to 23d are bent by changing the direction of the groove on the tread surface. The third groove turning portions may have the same configuration as that of the groove turning portions of the center lug grooves. In specific, the third groove turning portions may have a bent shape, a curved shape, or a combination of a bent shape and a curved shape. The curved shape includes a shape formed by rounding the peak of a bent shape, for example, with a predetermined radius of curvature. The combination of a bent shape and a curved shape indicates such a shape that one side of the peak of a groove turning portion extends straight and the other side extends from the peak while being curved. The third groove turning portions included in the circumferential secondary grooves 23 may have the same shape or mutually different shapes among a bent shape, a curved shape, and a combination thereof.

Sections other than the third groove turning portions in the circumferential secondary grooves 23 may be straight or curved. If both the groove turning portions and the sections other than the groove turning portions are curved, both curved shapes may have the same radius of curvature.

The third groove turning portions 23a to 23d illustrated in FIG. 2 consist of the third groove turning portions 23a, 23c that are bent in the right half-tread region and the third groove turning portions 23b, 23d that are bent in the left half-tread region when the groove extends downward from above in the tire circumferential direction. The distance between the third groove turning portion 23a and the third groove turning portion 23c in the tire circumferential direction is equal to the distance between the third groove turning portion 23b and the third groove turning portion 23d in the tire circumferential direction. This configuration allows the circumferential secondary groove 23 to have a section extending in a wavy shape. The third groove turning portions 23a to 23d formed in the circumferential secondary groove 23 increase the area of groove walls and thus enhance heat dissipation. Accordingly, heat resistance is enhanced. Four third groove turning portions are formed in FIG. 2; however, the number of the third groove turning portions to be formed in each of the center block 21 regions is at least one and may be, for example, one, two, three, or five or greater. As illustrated in FIG. 2, the tire equator line CL preferably passes through sections connecting the groove turning portion 23a with the groove turning portion 23b, the groove turning portion 23b with the groove turning portion 23c, and the groove turning portion 23c with the groove turning portion 23d.

A ratio $P_4/P_1$ of the width $P_4$ of the circumferential secondary grooves 23 to the width $P_1$ of the circumferential primary grooves 15, 17 within the above range ensures heat dissipation of the circumferential secondary grooves 23 equivalent to that of the circumferential primary grooves 15, 17, and a narrow width of the circumferential secondary grooves 23 prevents a decrease in resistance to stone lodging. In this specification, concerning resistance to stone lodging, the target size of stones or foreign materials is not limited; however, the target is, for example, 2 to 20 mm stones or the like. The width $P_4$ and the width $P_1$ are lengths on the tread surface in directions orthogonal to the extending directions of their respective grooves. More preferably, the ratio $P_4/P_1$ is from 0.75 to 0.85, for example, 0.80.

Figure 3:
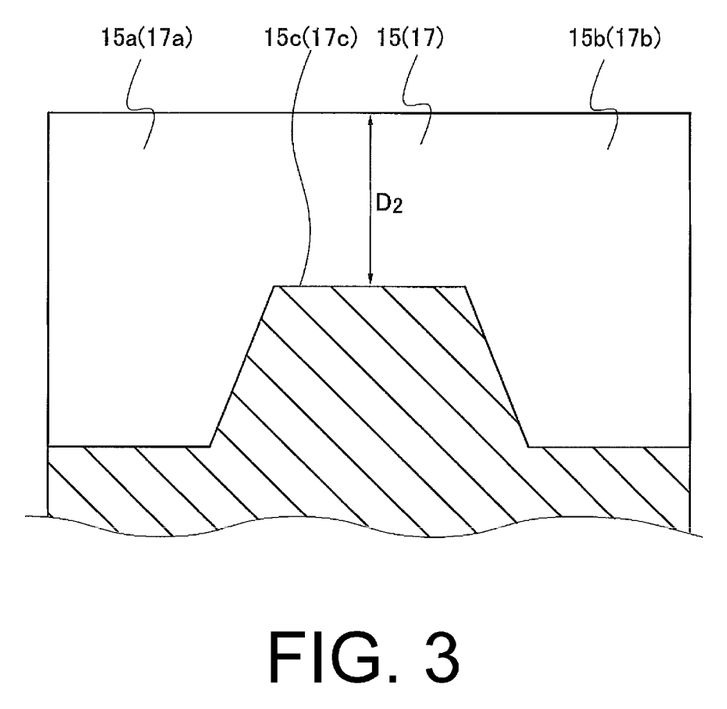
FIG. 3 is a cross-sectional view of a raised bottom portion of a circumferential primary groove.

The tire 1 according to the present embodiment preferably includes raised bottom portions 15c, 17c that are disposed in the circumferential primary grooves 15, 17 and are formed by partially making the groove depth shallow, as illustrated in FIG. 3. FIG. 3 is a cross-sectional view of the raised bottom portions 15c, 17c cut in the groove extending direction. In FIG. 3, reference signs of portions of the circumferential primary groove 15 are indicated without parentheses, and reference signs of portions of the circumferential primary groove 17 in parentheses. The raised bottom portions 15c, 17c are formed in straight sections composing the wavy shapes of the circumferential primary grooves 15, 17.

The raised bottom portions 15c, 17c have raised bottoms in the central regions in the extending directions of the circumferential primary grooves 15, 17. This configuration allows the center blocks 21 and the shoulder blocks 25 to support each other and thus prevents the blocks from falling, resulting in a reduction of the amount of deformation of the blocks. Accordingly, heat resistance is enhanced. Moreover, deep depths of the circumferential primary grooves 15, 17 at points (second groove turning portions) 15a, 15b, 17a, 17b connecting with the shoulder lug grooves 11, 13 provide good heat dissipation. This also exhibits good heat resistance. The raised bottom portions 15c, 17c may have a constant depth as illustrated in the drawing or varying depths. Varying depths include, for example, two or more different depths with steps disposed therebetween and continuously varying depths. The length of the raised bottom portions 15c, 17c is not limited; however, the raised bottom portions 15c, 17c extend over regions having a length of, for example, 30 to 70% of the length between the first groove turning portions 15a, 17a and the second groove turning portions 15b, 17b. The raised bottom portions may be formed in one or both end regions without being formed in the central regions in the groove extending directions, unlike the configuration illustrated in FIG. 3.

The ratio $D_2/T$ of the shallowest depth $D_2$ of the raised bottom portions 15c, 17c to a tread width T of the tread portion 6 in the tire width direction is preferably less than 0.05. The depth $D_2$ is a length from the tread surface to the raised bottom portions 15c, 17c in FIG. 3. The tread width T is a length between the ground contact edges 10a, 10b in the tire width direction. A ratio $D_2/T$ of less than 0.05 allows the center blocks 21 and the shoulder blocks 25 to support each other and thus ensures rigidity of the center blocks 21, resulting in a prevention of heat buildup due to deformation of the blocks and an enhancement in heat resistance. More preferably, the ratio $D_2/T$ is 0.40 or less, for example, 0.03. The lower limit of the ratio $D_2/T$ is not particularly limited but, for example, 0.01 or 0.02 to ensure breathability for heat dissipation.

In the tire 1 according to the present embodiment, the ratio $D_4/D_3$ of the deepest depth $D_4$ of the circumferential secondary grooves 23 to the deepest depth $D_3$ of the center lug grooves 14 is preferably 0.4 to 1.0. $D_3$ and $D_4$ are indicated in FIG. 1. The center lug grooves 14 are not illustrated in FIG. 1; however, the deepest point of the bottom of the center lug grooves 14 is indicated by the horizontal broken line. A ratio $D_4/D_3$ within this range achieves good resistance to stone lodging and heat resistance in a compatible manner. A ratio $D_4/D_3$ of 0.4 or greater ensures a sufficient cross-sectional area of the grooves in the center block 21 regions and enhances heat dissipation, resulting in an enhancement of heat resistance. A ratio $D_4/D_3$ of 1.0 or less reduces opening and closing movement of the circumferential secondary grooves 23 during tire rolling motion and thus enhances resistance to stone lodging. The depth $D_4$ and the depth $D_3$ each indicate the depth of the groove if the depth is constant in the groove extending direction or the deepest depth if the depth varies in the groove extending direction. More preferably, the ratio $D_4/D_3$ is from 0.6 to 0.8, for example, 0.7.

Figure 4:
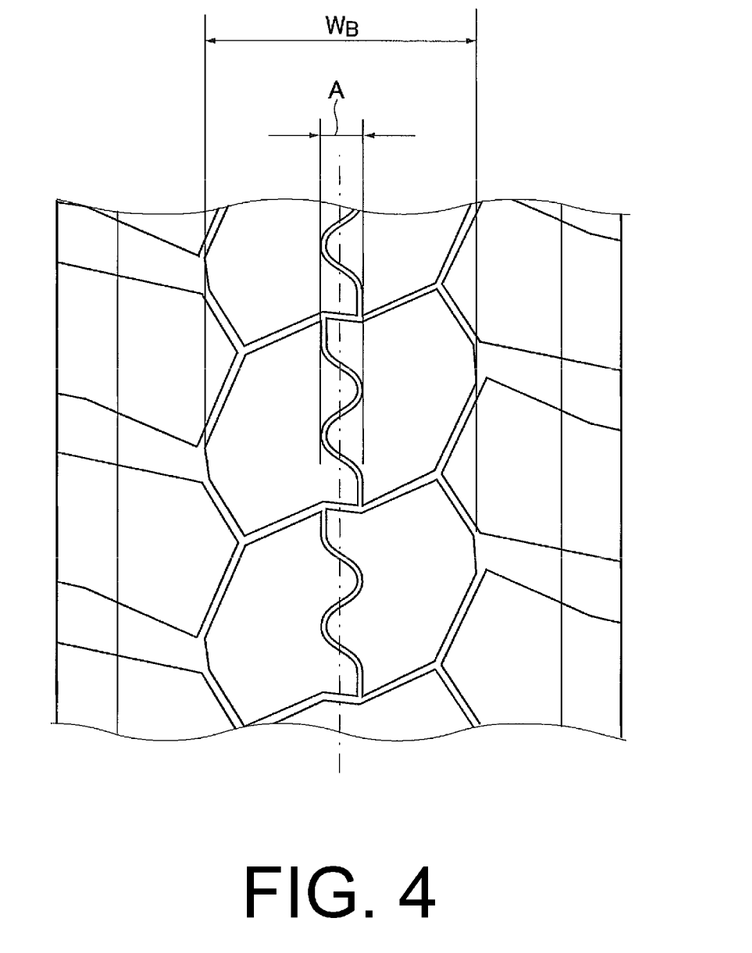
FIG. 4 illustrates a maximum width A and a maximum width $W_B$ using FIG. 2.

In the tire 1 according to the present embodiment, the ratio $A/W_B$ of the maximum width A being the maximum displacement value of the circumferential secondary grooves 23 in the tire width direction to the maximum width $W_B$ of the center blocks 21 is preferably 0.05 to 0.35. As illustrated in FIG. 4, the maximum width A is also a length of the circumferential secondary grooves 23 in the tire width direction. FIG. 4 illustrates the maximum width A and the maximum width $W_B$ using FIG. 2. The maximum width $W_B$ of the center blocks 21 is the maximum length parallel to the tire width direction and is equal to the length of the distance between the first groove turning portions 15a, 17a and the second groove turning portions 15b, 17b projected in the tire width direction. A ratio $A/W_B$ within an upper range achieves good resistance to stone lodging and heat resistance in a compatible manner. A ratio $A/W_B$ of 0.05 or greater increases the surface area of the circumferential secondary grooves 23 and thus enhances heat resistance. A ratio $A/W_B$ of 0.35 or less reduces opening and closing movement of the circumferential secondary grooves 23 in the center block 21 regions during tire rolling motion and thus enhances resistance to stone lodging. More preferably, the ratio $A/W_B$ is from 0.15 to 0.25, for example, 0.2.

As illustrated in FIG. 2, each of the center lug grooves 14 preferably includes at least one groove turning portion at which the groove extending direction changes, for example, at least one of the fourth groove turning portion 14a and the fifth groove turning portion 14b. The fourth groove turning portion 14a and the fifth groove turning portion 14b are bent by changing the direction of the groove on the tread surface and protrude toward opposite sides in the tire width direction. The center lug groove 14 including the groove turning portions increases the surface area of the groove wall and thus enhances heat dissipation, resulting in an enhancement in heat resistance. The center lug groove 14 changes its position in a wavy manner in the tire circumferential direction by including the groove turning portions 14a, 14b. The number of the groove turning portions of the center lug groove 14 is at least one and may be, for example, one, three, four, or the like; however, a plurality of the groove turning portions is preferably provided to enhance heat resistance by enhancing heat dissipation.

In specific, both the fourth groove turning portion 14a and the fifth groove turning portion 14b are preferably provided. In this case, the center lug groove 14 preferably extends so as to connect the fourth groove turning portion 14a of one center lug groove 14, adjoining the center block 21, of two adjacent center lug grooves 14 in the tire circumferential direction with the fifth groove turning portion of the groove turning portions of the other center lug groove 14. This configuration allows the circumferential secondary grooves 23 to open to the groove turning portions 14a, 14b of the center lug grooves 14 and thus provides good heat dissipation, resulting in a further enhancement in heat resistance. Both ends of the circumferential secondary grooves 23 in the tire circumferential direction may be in the same position in the tire width direction. For example, the circumferential secondary grooves 23 in FIG. 2 may extend so as to connect the fourth groove turning portions 14a or the fifth groove turning portions 14b of adjacent center lug grooves 14 in the tire circumferential direction with each other. The circumferential secondary grooves 23 may open to sections other than the fourth groove turning portions 14a and the fifth groove turning portions 14b of the center lug grooves 14. For example, the circumferential secondary grooves 23 may open to sections extending straight of the center lug grooves 14. In this case, the circumferential secondary grooves 23 preferably open to sections between the fourth groove turning portions 14a and the fifth groove turning portions 15b.

The groove turning portions 14a, 14b have a bent shape in FIG. 2 but may have a curved shape or a combination of a bent shape and a curved shape. The curved shape includes a shape formed by rounding the peak of a bent shape, for example, with a predetermined radius of curvature. The combination of a bent shape and a curved shape indicates such a shape that one side of the peak of a groove turning portion extends straight and the other side extends from the peak while being curved. The groove turning portions included in the center lug grooves 14 may have the same shape or mutually different shapes among a bent shape, a curved shape, and a combination thereof.

Sections other than the groove turning portions in the center lug grooves 14 may be straight or curved. If both the groove turning portions and the sections other than the groove turning portions are curved, both curved shapes may have the same radius of curvature.

The groove turning portions 14a, 14b are preferably disposed in positions separated from the tire center line CL by the same distance on both sides of the tire center line CL in the tire width direction. The tire center line CL passes through sections between the groove turning portions 14a and the groove turning portions 14b in the center lug grooves 14. The inclining direction of the center lug grooves 14 with respect to the tire width direction changes in these sections.

More specifically, the center lug grooves 14 preferably have the configuration described below.

Figure 5:
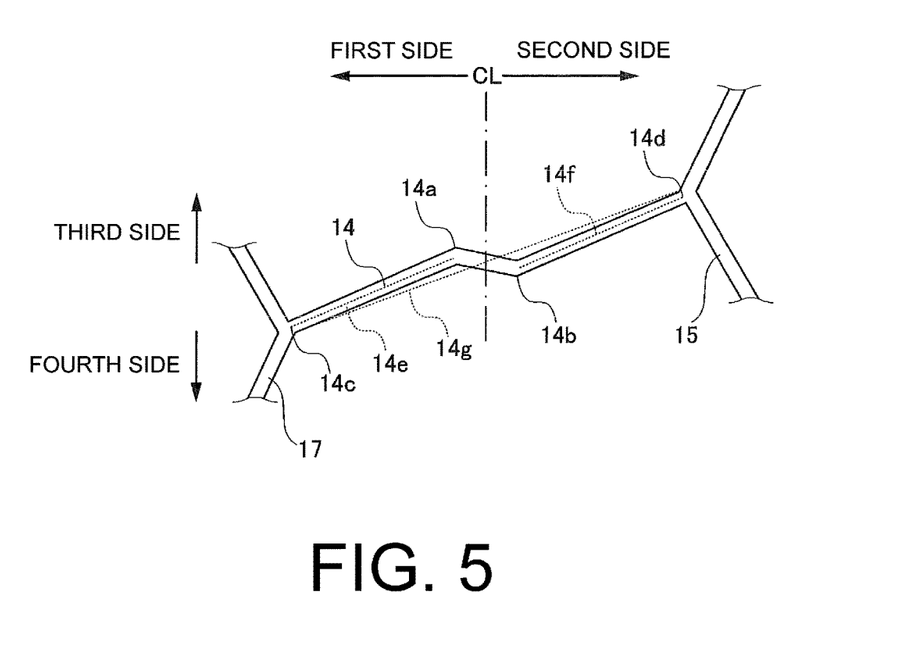
FIG. 5 is an enlarged view of a center lug groove.

FIG. 5 illustrates a specific shape of the center lug groove 14 illustrated in FIG. 2. For the sake of convenience of the description, the circumferential secondary grooves 23 are omitted in FIG. 5. As illustrated in FIG. 5, the fourth groove turning portion 14a of the center lug groove 14 is preferably bent or curved so as to protrude toward a third side in the tire circumferential direction (the upper side in FIG. 5) on the first side of the tire equator line CL (the right side in FIG. 5).

The fifth groove turning portion 14b of the center lug groove 14 is preferably bent or curved so as to protrude toward a fourth side opposite to the third side in the tire circumferential direction (the lower side in FIG. 5) on the second side of the tire equator line CL (the left side in FIG. 5). Here, the center lug groove 14 connects with the circumferential primary groove 17 at a first connection end 14c on the first side and with the circumferential primary groove 15, 17 at a second connection end 14d on the second side. The first connection end 14c and the second connection end 14d are tips of the circumferential primary grooves 17, 15 on the inside in the tire width direction, that is, the second groove turning portions 17b, 15b. The second connection end 14d of the center lug groove 14 is positioned on the third side in the tire circumferential direction (the upper side in FIG. 5) with respect to the first connection end 14c.

Concerning the central position of the center lug groove 14 in the groove width direction, the inclination angle of a first straight line 14e connecting a protruding end, protruding toward the third side in the tire circumferential direction (the upper side in FIG. 5), of the fourth groove turning portion 14a with the first connection end 14c with respect to the tire width direction (an inclination angle of greater than 0° and less than 90°) and the inclination angle of a second straight line 14f connecting a protruding end, protruding toward the fourth side in the tire circumferential direction, of the fifth groove turning portion 14b with the second connection end 14d with respect to the tire width direction (an inclination angle of greater than 0° and less than 90°) are preferably greater than the inclination angle of the third straight line 14 g connecting the first connection end 14c and the second connection end 14d of the center lug groove 14 with respect to the tire width direction (an inclination angle of greater than 0° and less than 90°).

In a preferred configuration of the present embodiment, concerning the central position of the center lug groove 14 in the groove width direction, a section of the center lug groove 14 between the protruding end, protruding toward the third side in the tire circumferential direction, of the fourth groove turning portion 14a and the first connection end 14c is on the first straight line 14e or on the third side with respect to the first straight line 14e, and a section of the center lug groove 14 between the protruding end, protruding toward the fourth side in the tire circumferential direction, of the fifth groove turning portion 14b and the second connection end 14d is on the second straight line 14f or on the fourth side with respect to the second straight line 14f, as illustrated in FIGS. 2, 5.

The center blocks 21 are formed with this configuration, and the tread rigidity of the center blocks 21 is thus enhanced. That is, the center blocks 21 each have an anisotropic shape defined by the center lug grooves 14 inclined in one direction with respect to the tire width direction. When the center block 21 is separated from a road surface and pushed off from a tire contact surface, the anisotropic shape twists the center block 21 clockwise or anticlockwise and deforms the center block 21. At this time, the circumferential primary grooves 15, 17 having a narrow width allow the center block 21 to engage with shoulder blocks adjacent in the tire width direction across the circumferential primary grooves 15, 17 at the first and second groove turning portions 15a, 17a, 15b, 17b and to function integrally, resulting in an enhancement in tread rigidity of the center block 21. The enhanced tread rigidity of the center block 21 prevents the center block 21 from being twisted and prevents local wear of the center block 21 on both sides of the center lug grooves 14 in the tire circumferential direction.

The third and fourth groove turning portions 14a, 14b can further enhance tread rigidity of the center block 21. That is, when the center block 21 is separated and pushed off from a road surface, shear force is applied from the road surface to the center block 21 in the tire circumferential direction and thus deforms the center block 21 to fall. At this time, adjacent center blocks 21 in the circumferential direction engage with each other at the third and fourth groove turning portions 14a, 14b of the center lug groove 14 and function integrally to generate counter force, resulting in an enhancement in tread rigidity of the center block 21. The enhanced tread rigidity of the center block 21 prevents the center block 21 from falling and prevents local wear of the center block 21 on both sides of the center lug grooves 14 in the tire circumferential direction.

The center block 21 is prevented from being twisted as described above and is thus prevented from being deformed. This prevention reduces heat buildup of the center block 21 and thus enhances heat resistance. The center lug groove 14 includes the third and fourth groove turning portions 14a, 14b and has a long length by inclining the third straight line 14 g with respect to the tire width direction. This configuration increases the surface area of the groove wall and thus enhances heat dissipation. Accordingly, heat resistance is enhanced.

The above-described engagement between the center block 21 and the shoulder blocks and engagement between the center blocks 21 reduce opening and closing movement of the center lug grooves 14 in the center block 21 region during tire rolling motion and thus enhance resistance to stone lodging.

The depth of the circumferential secondary grooves 23 is preferably shallower than that of the circumferential primary grooves 15, 17 in view of resistance to stone lodging but may be the same as or deeper than that of the circumferential primary grooves 15, 17 in view of heat resistance. Here, the depth of the circumferential primary grooves 15, 17 indicates the deepest depth if the depth of the circumferential primary grooves 15, 17 varies. The width of the circumferential secondary grooves 23 is preferably 70 to 90% of that of the circumferential primary grooves 15, 17 in view of resistance to stone lodging but may be 90 to 110% of that of the circumferential primary grooves 15, 17 in view of heat resistance.

The circumferential secondary grooves 23 extend in the tire circumferential direction while crossing the tire center line CL in FIG. 2 but may not cross the tire center line CL and be formed on one side of the tire center line CL in the tire width direction. The circumferential secondary groove 23 is formed in each of the center blocks 21, and two adjacent circumferential secondary grooves 23 in the tire circumferential direction communicate with each other through the center lug groove 14.

In the tire 1 according to the present embodiment, the second groove turning portions 15b, 17b of the circumferential primary grooves 15, 17 are preferably bent at an obtuse angle on the tread surface as illustrated in FIG. 2. This configuration reduces movement of the center blocks 21 and the shoulder blocks 25, 27 during rolling motion and thus enhances heat resistance. The bending angle of the second groove turning portions 15b, 17b is, for example, 100° to 140°.

In the tire 1 according to the present embodiment, the width of the circumferential primary grooves 15, 17 and the center lug grooves 14 is preferably 7 to 20 mm. This width achieves good resistance to stone lodging and heat resistance in a compatible manner. The width of the circumferential primary grooves 15, 17 and the center lug grooves 14 is, for example, 15 mm. A width of the circumferential primary grooves 15, 17 and the center lug grooves 14 within the above-described range is suitable for using the tire 1 as an off-road tire.

The above-described heavy duty pneumatic tire is suitably fitted to construction or industrial vehicles. Construction or industrial vehicles include, for example, damp trucks, scrapers, graders, shovel loaders, tired rollers, wheel cranes, and truck cranes written in JATMA, or vehicles, such as "compactors", "earthmoving", "greaders", and "loaders and dozers" defined by TRA.

In the heavy duty pneumatic tire 1 according to the present embodiment, the circumferential secondary grooves 23 formed in the center block 21 regions ensure a sufficient surface area of the grooves in the central region in the tire width direction and thus enhance heat dissipation and heat resistance. The circumferential secondary grooves 23 extend in the tire circumferential direction while changing their positions in the tire width direction and include the third groove turning portions 23a to 23d at which the groove extending direction changes in the tire width direction, such that the area of the groove walls is increased, resulting in an enhancement in heat dissipation. Accordingly, heat resistance is enhanced. A ratio $P_4/P_1$ of 0.70 to 1.10 of the width $P_4$ of the circumferential secondary grooves 23 to the width $P_1$ of the circumferential primary grooves 15, 17 ensures heat dissipation of the circumferential secondary grooves 23 equivalent to that of the circumferential primary grooves 15, 17, and a narrow width of the circumferential secondary grooves 23 prevents a decrease in resistance to stone lodging.

The tread pattern according to the present embodiment has been described using a preferred configuration illustrated in FIGS. 2, 5 in which the center lug grooves 14 include the fourth groove turning portions 14a and the fifth groove turning portions 14b and the third straight lines 14 g are inclined with respect to the tire width direction; however, the tread pattern may include center lug grooves 14 without the first groove turning portions 14a and the second groove turning portions 14b or center lug grooves 14 having the third straight lines 14 g extending straight in the tire width direction, instead of the center lug grooves 14 in the preferred configuration.

WORKING EXAMPLES

Various tires having different tread patterns as shown in Tables 1 to 6 (Working Examples 1 to 18, Conventional Example, Comparative Examples 1 to 4) were prepared to check effect of the tire according to the present embodiment. Resistance to stone lodging in a tread central region and heat resistance were checked. Specifications other than those shown in Tables 1 to 6 of the tires for the examples other than Conventional Example followed specifications of the tread pattern in FIG. 2.

Working Example 16 had the same specifications as those of Working Example 1, except for the third straight lines 14 g of the center lug grooves 14 that were not inclined with respect to the tire width direction in Working Example 16.

Working Example 17 had the same specifications as those of Working Example 14, except for two groove turning portions (the fourth groove turning portion and the fifth groove turning portion) provided in each of the center lug grooves 14 in Working Example 17.

Working Example 18 had the same specifications as those of Working Example 17, except for the third straight lines 14 g of the center lug grooves 14 that were not inclined with respect to the tire width direction in Working Example 18.

Figure 6:
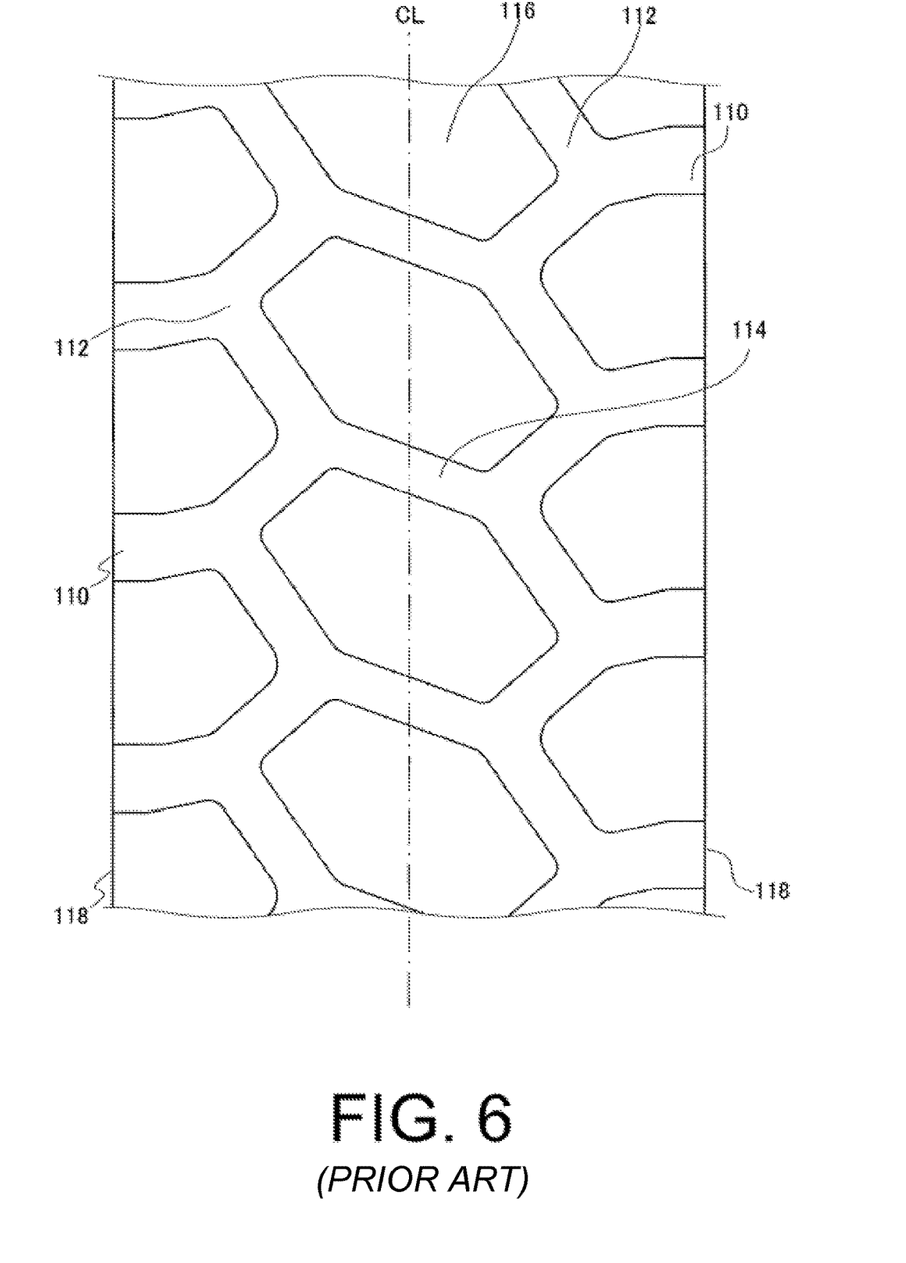
FIG. 6 illustrates a tread pattern of a conventional tire.

The tread pattern illustrated in FIG. 6 was applied to Conventional Example. FIG. 6 illustrates the tread pattern of Conventional Example. The tread pattern illustrated in FIG. 6 includes shoulder lug grooves 110, a pair of circumferential primary grooves 112, center lug grooves 114, and center blocks 116. The shoulder lug grooves 110, the pair of circumferential primary grooves 112, the center lug grooves 114, and the center blocks 116 respectively have similar configurations to the shoulder lug grooves 11, 13, the pair of circumferential primary grooves 15, 17, the center lug grooves 14, and the center blocks 21; however, the shoulder lug grooves 110 and the circumferential primary grooves 112 have the same width as that of the shoulder lug grooves 11, 13.

The size of each of the prepared tires was 46/90R57. The tires were mounted on 29.00-6.0 rims (TRA specified rim). A 400-ton dump truck with the tires traveled on the same off-road surface under a test condition of an air pressure of 700 kPa (TRA specified air pressure) to test resistance to stone lodging and heat resistance.

Resistance to Stone Lodging

The prepared tires were fitted to the real vehicle. After the vehicle went back and forth five times in a 30 m section in a quarry paved with 2 to 20 mm stones under a test condition of an applied load of 617.82 kN (TRA specified load), the number of stones lodged in the grooves adjoining the center blocks (circumferential primary grooves, center lug grooves) and the grooves in the center block regions (circumferential secondary grooves) was counted visually and indexed with the number in Conventional Example expressed as 100. A greater index indicates better resistance to stone lodging.

Heat Resistance

The prepared tire was mounted on an indoor drum testing machine. The machine ran at a speed of 5 km/hour under a test condition of an applied load of 110% of the maximum specified load (617.82 kN) conforming to TRA. The speed was increased by 1 km/hour every 12 hours. The running time until the tire blew out was measured. The result was indexed with the result of Conventional Example expressed as 100. A greater index indicates better heat resistance.

As a result, a case with the index of resistance to stone lodging being 95 or greater and the index of heat resistance being 105 or greater was evaluated as the case with reduced stone lodging and enhanced heat resistance, that is, the case where good resistance to stone lodging and heat resistance were achieved in a compatible manner. In this way, achieving good resistance to stone lodging and heat resistance in a compatible manner includes not only enhancing both resistance to stone lodging and heat resistance but also maintaining any one of resistance to stone lodging and heat resistance equivalently to that of conventional tires and enhancing the other. The phrase "maintaining resistance equivalently to that of conventional tires" indicates that the resistance is not significantly inferior to conventional tires (for example, the index of resistance to stone lodging or heat resistance is not less than that of Conventional Example by greater than 5).

TABLE 1

|  | Conventional Example | Comparative Example 1 | Comparative Example 2 |
|---|---|---|---|
| Circumferential secondary grooves | Absent | Present | Present |
| Number of groove turning portions in each circumferential secondary groove | — | 0 | 0 |
| $P_4/P_1$ | — | 1.50 | 1.00 |
| Raised bottom portions of circumferential primary grooves | Absent | Absent | Absent |
| $D_2/T$ | — | — | — |
| $D_4/D_3$ | — | 1.1 | 1.1 |
| $A/W_B$ | — | 0.50 | 0.50 |
| Number of groove turning portions in each center lug groove | 0 | 0 | 0 |

TABLE 1-continued

| | | | |
|---|---|---|---|
| Heat resistance | 100 | 108 | 104 |
| Resistance to stone lodging | 100 | 92 | 96 |

| | Conventional Example | Comparative Example 3 | Comparative Example 4 |
|---|---|---|---|
| Circumferential secondary grooves | Absent | Present | Present |
| Number of groove turning portions in each circumferential secondary groove | — | 1 | 1 |
| $P_4/P_1$ | — | 0.60 | 1.50 |
| Raised bottom portions of circumferential primary grooves | Absent | Absent | Absent |
| $D_2/T$ | — | — | — |
| $D_4/D_3$ | — | 1.1 | 1.1 |
| $A/W_B$ | — | 0.50 | 0.50 |
| Number of groove turning portions in each center lug groove | 0 | 0 | 0 |
| Heat resistance | 100 | 104 | 109 |
| Resistance to stone lodging | 100 | 96 | 91 |

TABLE 2

| | Working Example 1 | Working Example 2 | Working Example 3 |
|---|---|---|---|
| Circumferential secondary grooves | Present | Present | Present |
| Number of groove turning portions in each circumferential secondary groove | 1 | 2 | 3 |
| $P_4/P_1$ | 0.7 | 1.00 | 1.00 |
| Raised bottom portions of circumferential primary grooves | Absent | Absent | Absent |
| $D_2/T$ | — | — | — |
| $D_4/D_3$ | 1.1 | 1.1 | 1.1 |
| $A/W_B$ | 0.50 | 0.50 | 0.50 |
| Number of groove turning portions in each center lug groove | 0 | 0 | 0 |
| Heat resistance | 105 | 106 | 107 |
| Resistance to stone lodging | 97 | 96 | 95 |

As shown in Tables 1, 2, with the circumferential secondary grooves not including the third groove turning portions, a ratio $P_4/P_1$ of greater than 1.10 did not provide enhanced resistance to stone lodging (Comparative Example 1), and a ratio $P_4/P_1$ of 0.7 to 1.10 did not provide enhanced heat resistance (Comparative Example 2).

With the circumferential secondary grooves including the third groove turning portions, a ratio $P_4/P_1$ of less than 0.7 did not provide enhanced heat resistance (Comparative Example 3), and a ratio $P_4/P_1$ of greater than 1.10 provided enhanced heat resistance but lessened resistance to stone lodging (Comparative Example 4).

In contrast, the cases where the circumferential secondary grooves included the third groove turning portions and the ratio $P_4/P_1$ was 0.7 to 1.10 (Working Examples 1 to 3) achieved good resistance to stone lodging and heat resistance in a compatible manner.

TABLE 3

| | Working Example 4 | Working Example 5 | Working Example 6 |
|---|---|---|---|
| Circumferential secondary grooves | Present | Present | Present |
| Number of groove turning portions in each circumferential secondary groove | 3 | 3 | 3 |
| $P_4/P_1$ | 1.00 | 1.00 | 1.00 |
| Raised bottom portions of circumferential primary grooves | Present | Present | Present |
| $D_2/T$ | 0.06 | 0.05 | 0.03 |
| $D_4/D_3$ | 1.1 | 1.1 | 1.1 |
| $A/W_B$ | 0.50 | 0.50 | 0.50 |
| Number of groove turning portions in each center lug groove | 0 | 0 | 0 |
| Heat resistance | 109 | 110 | 111 |
| Resistance to stone lodging | 95 | 95 | 95 |

As shown in Table 3, the case with a ratio $D_2/T$ of less than 0.05 (Working Example 6) achieved good resistance to stone lodging and heat resistance in a compatible manner in a higher level than the cases with a ratio $D_2/T$ of 0.05 or greater (Working Examples 4, 5). A case where the index of resistance to stone lodging being 95 or greater, the index of heat resistance being 105 or greater, and the sum of both indices being 206 or greater was evaluated as the case where good resistance to stone lodging and heat resistance were achieved in a compatible manner in a higher level.

TABLE 4

| | Working Example 7 | Working Example 8 | Working Example 9 | Working Example 10 |
|---|---|---|---|---|
| Circumferential secondary grooves | Present | Present | Present | Present |
| Number of groove turning portions in each circumferential secondary groove | 3 | 3 | 3 | 3 |
| $P_4/P_1$ | 1.00 | 1.00 | 1.00 | 1.00 |
| Raised bottom portions of circumferential primary grooves | Present | Present | Present | Present |
| $D_2/T$ | 0.06 | 0.05 | 0.05 | 0.06 |
| $D_4/D_3$ | 0.2 | 0.4 | 1.0 | 1.2 |
| $A/W_B$ | 0.50 | 0.50 | 0.50 | 0.50 |
| Number of groove turning portions in each center lug groove | 0 | 0 | 0 | 0 |
| Heat resistance | 108 | 109 | 110 | 110 |
| Resistance to stone lodging | 97 | 97 | 96 | 95 |

As shown in Table 4, the cases with a ratio $D_4/D_3$ of 0.4 to 1.0 (Working Examples 8, 9) achieved good resistance to stone lodging and heat resistance in a compatible manner in a higher level than the cases with a ratio $D_4/D_3$ outside the range of 0.4 to 1.0 (Working Examples 7, 10).

TABLE 5

|  | Working Example 11 | Working Example 12 | Working Example 13 | Working Example 14 | Working Example 15 |
|---|---|---|---|---|---|
| Circumferential secondary grooves | Present | Present | Present | Present | Present |
| Number of groove turning portions in each circumferential secondary groove | 3 | 3 | 3 | 3 | 3 |
| $P_4/P_1$ | 1.00 | 1.00 | 1.00 | 1.00 | 1.00 |
| Raised bottom portions of circumferential primary grooves | Present | Present | Present | Present | Present |
| $D_2/T$ | 0.05 | 0.05 | 0.05 | 0.05 | 0.05 |
| $D_4/D_3$ | 1.0 | 1.0 | 1.0 | 1.0 | 1.0 |
| $A/W_B$ | 0.02 | 0.05 | 0.15 | 0.35 | 0.40 |
| Number of groove turning portions in each center lug groove | 0 | 0 | 0 | 0 | 0 |
| Heat resistance | 108 | 109 | 110 | 111 | 111 |
| Resistance to stone lodging | 98 | 98 | 98 | 96 | 95 |

As shown in Table 5, the cases with a ratio $A/W_B$ of 0.05 to 0.35 (Working Examples 12 to 14) achieved good resistance to stone lodging and heat resistance in a compatible manner in a higher level than the cases with a ratio $A/W_B$ outside the range of 0.05 to 0.35 (Working Examples 11, 15).

TABLE 6

|  | Working Example 16 | Working Example 17 | Working Example 18 |
|---|---|---|---|
| Circumferential secondary grooves | Present | Present | Present |
| Number of groove turning portions in each circumferential secondary groove | 1 | 3 | 3 |
| $P_4/P_1$ | 0.7 | 1.00 | 1.00 |
| Raised bottom portions of circumferential primary grooves | Absent | Present | Present |
| $D_2/T$ | — | 0.05 | 0.05 |
| $D_4/D_3$ | 1.1 | 1.0 | 1.0 |
| $A/W_B$ | 0.50 | 0.35 | 0.35 |
| Number of groove turning portions in each center lug groove | 0 | 2 | 2 |
| Heat resistance | 105 | 113 | 112 |
| Resistance to stone lodging | 96 | 96 | 95 |

As shown in Table 6, even if the third straight lines 14g of the center lug grooves 14 in the tread pattern are not inclined with respect to the tire width direction (Working Examples 16, 18), the effect of the present embodiment is achieved. However, on comparison between the evaluation results of Working Example 16 and Working Example 1 in Table 2 and between the evaluation results of Working Example 18 and Working Example 17, it is understood that the center lug grooves 14 in the tread pattern are preferably inclined with respect to the tire width direction to enhance at least resistance to stone lodging.

It is also understood that the cases where the center lug grooves 14 include groove turning portions (Working Examples 17, 18) are preferable to enhance heat resistance.

The foregoing has been a detailed description of the heavy duty pneumatic tire of the present technology. However, the present technology is not limited to the above embodiments, and may be improved or modified in various ways within the scope of the present technology.

The invention claimed is:

1. A heavy duty pneumatic tire having a tread pattern, comprising a tread portion,
   the tread portion comprising, in the tread pattern:
   a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends;
   a plurality of shoulder lug grooves being disposed in each of the half-tread regions and separated from each other in the tire circumferential direction, the shoulder lug grooves extending outward in the tire width direction, the shoulder lug grooves including ends on an outside in the tire width direction opening at ground contact edges positioned on both sides in the tire width direction, the shoulder lug grooves including ends on an inside in the tire width direction positioned outward in the tire width direction with respect to ends of the center lug grooves, and the shoulder lug grooves each being disposed, in the tire circumferential direction, between adjacent center lug grooves in the tire circumferential direction among the center lug grooves;
   a pair of circumferential primary grooves being disposed in the respective half-tread regions, the circumferential primary grooves each being provided with first groove turning portions being curved or bent outward in the tire width direction and second groove turning portions being curved or bent inward in the tire width direction, the first groove turning portions and the second groove turning portions being arranged such that each of the pair of circumferential primary grooves alternately connects one of the ends of the center lug grooves and one of the ends of the shoulder lug grooves on the inside in the tire width direction, the circumferential primary grooves extending in the tire circumferential direction and being formed in wave-like shapes and having a narrower width than a width of the shoulder lug grooves;

a plurality of center blocks being defined by the center lug grooves and the pair of circumferential primary grooves and being aligned in the tire circumferential direction; and circumferential secondary grooves extending in the tire circumferential direction in respective regions of the center blocks and opening to the center lug grooves adjoining the center blocks;

the circumferential secondary grooves extending in the tire circumferential direction while changing positions thereof in the tire width direction, each of the circumferential secondary grooves comprising two straight portions and a position-changing portion, the two straight portions extending along the tire circumferential direction from two of the center lug grooves that sandwiches each of the circumferential secondary grooves, the position-changing portion provided between the two straight portions in the tire circumferential direction, comprising third groove turning portions being formed into bent shapes or curved shapes, the position-changing portion intersecting the tire equator line at least three times; and a ratio $P_4/P_1$ of a groove width $P_4$ of the circumferential secondary grooves to a groove width $P_1$ of the circumferential primary grooves being 0.70 to 1.10.

2. The heavy duty pneumatic tire according to claim 1, wherein the circumferential primary grooves each comprise a raised bottom portion formed by partially making a groove depth shallow.

3. The heavy duty pneumatic tire according to claim 2, wherein a ratio $D_2/T$ of a shallowest depth $D_2$ of the raised bottom portion to a tread width T of the tread portion in the tire width direction is less than 0.05.

4. The heavy duty pneumatic tire according to claim 1, wherein a ratio $D_4/D_3$ of a deepest depth $D_4$ of the circumferential secondary grooves to a deepest depth $D_3$ of the center lug grooves is from 0.6 to 0.8.

5. The heavy duty pneumatic tire according to claim 1, wherein a ratio $A/W_B$ of a maximum width A being a maximum displacement value of the circumferential secondary grooves in the tire width direction to a maximum width $W_B$ of the center blocks is from 0.05 to 0.35.

6. The heavy duty pneumatic tire according to claim 1, wherein the center lug grooves each comprise a fourth groove turning portion being formed into a bent shape or a curved shape.

7. The heavy duty pneumatic tire according to claim 6, wherein each of the center lug grooves extends while turning in a plurality of positions including the fourth groove turning portion and comprises a fifth groove turning portion differing from the fourth groove turning portion; and each of the circumferential secondary grooves extends so as to connect the fourth groove turning portion with the fifth groove turning portion, the fourth groove turning portion being one of the groove turning portions in one of the two center lug grooves adjoining a center block of the center blocks, and the fifth groove turning portion being one of the groove turning portions in another center lug grove of the two center lug grooves.

8. The heavy duty pneumatic tire according to claim 1, wherein each of corner portions of the center blocks formed in correspondence with the first groove turning portions, turning so as to protrude outward in the tire width direction, of the circumferential primary groove having the wave-like shapes is an obtuse angle corner.

9. The heavy duty pneumatic tire according to claim 1, wherein groove widths of the circumferential primary grooves and the center lug grooves are 7 to 20 mm.

10. The heavy duty pneumatic tire according to claim 1, wherein the heavy duty pneumatic tire is fitted to a construction or industrial vehicle.

11. The heavy duty pneumatic tire according to claim 1, wherein a length in the tire width direction between the two straight portions is identical to a maximum amount of position displacement of the position-changing portion in the tire width direction.

12. The heavy duty pneumatic tire according to claim 1, wherein the ratio $P_4/P_1$ is from 0.75 to 0.85.

13. The heavy duty pneumatic tire according to claim 1, wherein the center lug grooves each comprise a fourth groove turning portion being bent or curved so as to protrude toward a third side in the tire circumferential direction on the first side and a fifth groove turning portion being bent or curved so as to protrude toward a fourth side opposite to the third side in the tire circumferential direction on the second side;

the center lug grooves connect with the circumferential primary grooves at first connection ends thereof on the first side and at second connection ends thereof on the second side, the first connection ends and the second connection ends connecting with tips of the second groove turning portions on the inside in the tire width direction, the second connection ends of the center lug grooves being positioned on the third side in the tire circumferential direction with respect to the first connection ends; and concerning a central position of each of the center lug grooves in a groove width direction, an inclination angle with respect to the tire width direction of a first straight line that connects the first connection end with a protruding end protruding toward the third side in the tire circumferential direction, of the fourth groove turning portion and an inclination angle with respect to the tire width direction of a second straight line that connects the second connection end with a protruding end protruding toward the fourth side in the tire circumferential direction, of the fifth groove turning portion are greater than an inclination angle with respect to the tire width direction of a third straight line that connects the first connection end with the second connection end of each of the center lug grooves.

14. A heavy duty pneumatic tire having a tread pattern, comprising a tread portion, the tread portion comprising, in the tread pattern:

a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends;

a plurality of shoulder lug grooves being disposed in each of the half-tread regions and separated from each other in the tire circumferential direction, the shoulder lug grooves extending outward in the tire width direction, the shoulder lug grooves including ends on an outside in the tire width direction opening at ground contact edges positioned on both sides in the tire width direction, the shoulder lug grooves including ends on an inside in the tire width direction positioned outward in the tire width direction with respect to ends of the center lug grooves, and the shoulder lug grooves each being disposed, in the tire circumferential direction, between adjacent center lug grooves in the tire circumferential direction among the center lug grooves;

a pair of circumferential primary grooves being disposed in the respective half-tread regions, the circumferential primary grooves each being provided with first groove turning portions being curved or bent outward in the tire width direction and second groove turning portions being curved or bent inward in the tire width direction, the first groove turning portions and the second groove turning portions being arranged such that each of the pair of circumferential primary grooves alternately connects one of the ends of the center lug grooves and one of the ends of the shoulder lug grooves on the inside in the tire width direction, the circumferential primary grooves extending in the tire circumferential direction and being formed in wave-like shapes and having a narrower width than a width of the shoulder lug grooves;

a plurality of center blocks being defined by the center lug grooves and the pair of circumferential primary grooves and being aligned in the tire circumferential direction; and circumferential secondary grooves extending in the tire circumferential direction in respective regions of the center blocks and opening to the center lug grooves adjoining the center blocks;

the circumferential secondary grooves extending in the tire circumferential direction while changing positions thereof in the tire width direction, the circumferential secondary grooves comprising third groove turning portions being formed into a bent shape or a curved shape; and a ratio $P_4/P_1$ of a groove width $P_4$ of the circumferential secondary grooves to a groove width $P_1$ of the circumferential primary grooves being constant along the tire circumferential direction within a range of 0.70 to 1.10, the groove width $P_1$ being different from the groove width $P_4$; wherein the center lug grooves each comprise a fourth groove turning portion being bent or curved so as to protrude toward a third side in the tire circumferential direction on the first side and a fifth groove turning portion being bent or curved so as to protrude toward a fourth side opposite to the third side in the tire circumferential direction on the second side;

the center lug grooves connect with the circumferential primary grooves at first connection ends thereof on the first side and at second connection ends thereof on the second side, the first connection ends and the second connection ends connecting with tips of the second groove turning portions on the inside in the tire width direction, the second connection ends of the center lug grooves being positioned on the third side in the tire circumferential direction with respect to the first connection ends; and concerning a central position of each of the center lug grooves in a groove width direction, an inclination angle with respect to the tire width direction of a first straight line that connects the first connection end with a protruding end protruding toward the third side in the tire circumferential direction, of the fourth groove turning portion and an inclination angle with respect to the tire width direction of a second straight line that connects the second connection end with a protruding end protruding toward the fourth side in the tire circumferential direction, of the fifth groove turning portion are greater than an inclination angle with respect to the tire width direction of a third straight line that connects the first connection end with the second connection end of each of the center lug grooves.

15. The heavy duty pneumatic tire according to claim 14, wherein concerning the central position of each of the center lug grooves in the groove width direction, a section of the center lug groove between the protruding end protruding toward the third side in the tire circumferential direction, of the fourth groove turning portion and the first connection end is on the first straight line or on the third side with respect to the first straight line, and a section of the center lug groove between the protruding end protruding toward the fourth side in the tire circumferential direction, of the fifth groove turning portion and the second connection end is on the second straight line or on the fourth side with respect to the second straight line.

16. The heavy duty pneumatic tire having a tread pattern according to claim 14, wherein each of the circumferential secondary grooves connects, at an end on the third side thereof, the fourth groove turning portion, and each of the circumferential secondary grooves connects, at an end on the fourth side thereof, the fifth groove turning portion.

17. The heavy duty pneumatic tire having a tread pattern according to claim 14, wherein the ratio $P_4/P_1$ ranges from 0.70 to 0.85.

18. A heavy duty pneumatic tire having a tread pattern, comprising a tread portion, the tread portion comprising, in the tread pattern:

a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends;

a plurality of shoulder lug grooves being disposed in each of the half-tread regions and separated from each other in the tire circumferential direction, the shoulder lug grooves extending outward in the tire width direction, the shoulder lug grooves including ends on an outside in the tire width direction opening at ground contact edges positioned on both sides in the tire width direction, the shoulder lug grooves including ends on an inside in the tire width direction positioned outward in the tire width direction with respect to ends of the center lug grooves, and the shoulder lug grooves each being disposed, in the tire circumferential direction, between adjacent center lug grooves in the tire circumferential direction among the center lug grooves;

a pair of circumferential primary grooves being disposed in the respective half-tread regions, the circumferential primary grooves each being provided with first groove turning portions being curved or bent outward in the tire width direction and second groove turning portions being curved or bent inward in the tire width direction, the first groove turning portions and the second groove turning portions being arranged such that each of the pair of circumferential primary grooves alternately connects one of the ends of the center lug grooves and one of the ends of the shoulder lug grooves on the inside in the tire width direction, the circumferential primary grooves extending in the tire circumferential direction and being formed in wave-like shapes and having a narrower width than a width of the shoulder lug grooves;

a plurality of center blocks being defined by the center lug grooves and the pair of circumferential primary grooves and being aligned in the tire circumferential direction; and circumferential secondary grooves extending in the tire circumferential direction in respective regions of the center blocks and opening to the center lug grooves adjoining the center blocks;

the circumferential secondary grooves extending in the tire circumferential direction while changing positions thereof in the tire width direction, the circumferential secondary grooves comprising third groove turning portions being formed into a bent shape or a curved shape; and a ratio $P_4/P_1$ of a groove width $P_4$ of the circumferential secondary grooves to a groove width $P_1$ of the circumferential primary grooves being 0.70 to 1.10, the groove width $P_1$ being different from the groove width $P_4$;

a ratio $D_4/D_3$ of a deepest depth $D_4$ of the circumferential secondary grooves to a deepest depth $D_3$ of the center lug grooves being from 0.6 to 0.8; wherein the center lug grooves each comprise a fourth groove turning portion being bent or curved so as to protrude toward a third side in the tire circumferential direction on the first side and a fifth groove turning portion being bent or curved so as to protrude toward a fourth side opposite to the third side in the tire circumferential direction on the second side;

the center lug grooves connect with the circumferential primary grooves at first connection ends thereof on the first side and at second connection ends thereof on the second side, the first connection ends and the second connection ends connecting with tips of the second groove turning portions on the inside in the tire width direction, the second connection ends of the center lug grooves being positioned on the third side in the tire circumferential direction with respect to the first connection ends; and concerning a central position of each of the center lug grooves in a groove width direction, an inclination angle with respect to the tire width direction of a first straight line that connects the first connection end with a protruding end protruding toward the third side in the tire circumferential direction, of the fourth groove turning portion and an inclination angle with respect to the tire width direction of a second straight line that connects the second connection end with a protruding end protruding toward the fourth side in the tire circumferential direction, of the fifth groove turning portion are greater than an inclination angle with respect to the tire width direction of a third straight line that connects the first connection end with the second connection end of each of the center lug grooves.

19. The heavy duty pneumatic tire having a tread pattern according to claim 18, wherein each of the circumferential secondary grooves connects, at an end on the third side thereof, the fourth groove turning portion, and each of the circumferential secondary grooves connects, at an end on the fourth side thereof, the fifth groove turning portion.

20. The heavy duty pneumatic tire having a tread pattern according to claim 18, wherein the ratio $D_4/D_3$ ranges from 0.6 to 0.7.

* * * * *